Oct. 26, 1926.
J. W. WATSON
1,604,864
MOTION RETARDING DEVICE
Filed August 8, 1919    3 Sheets-Sheet 1
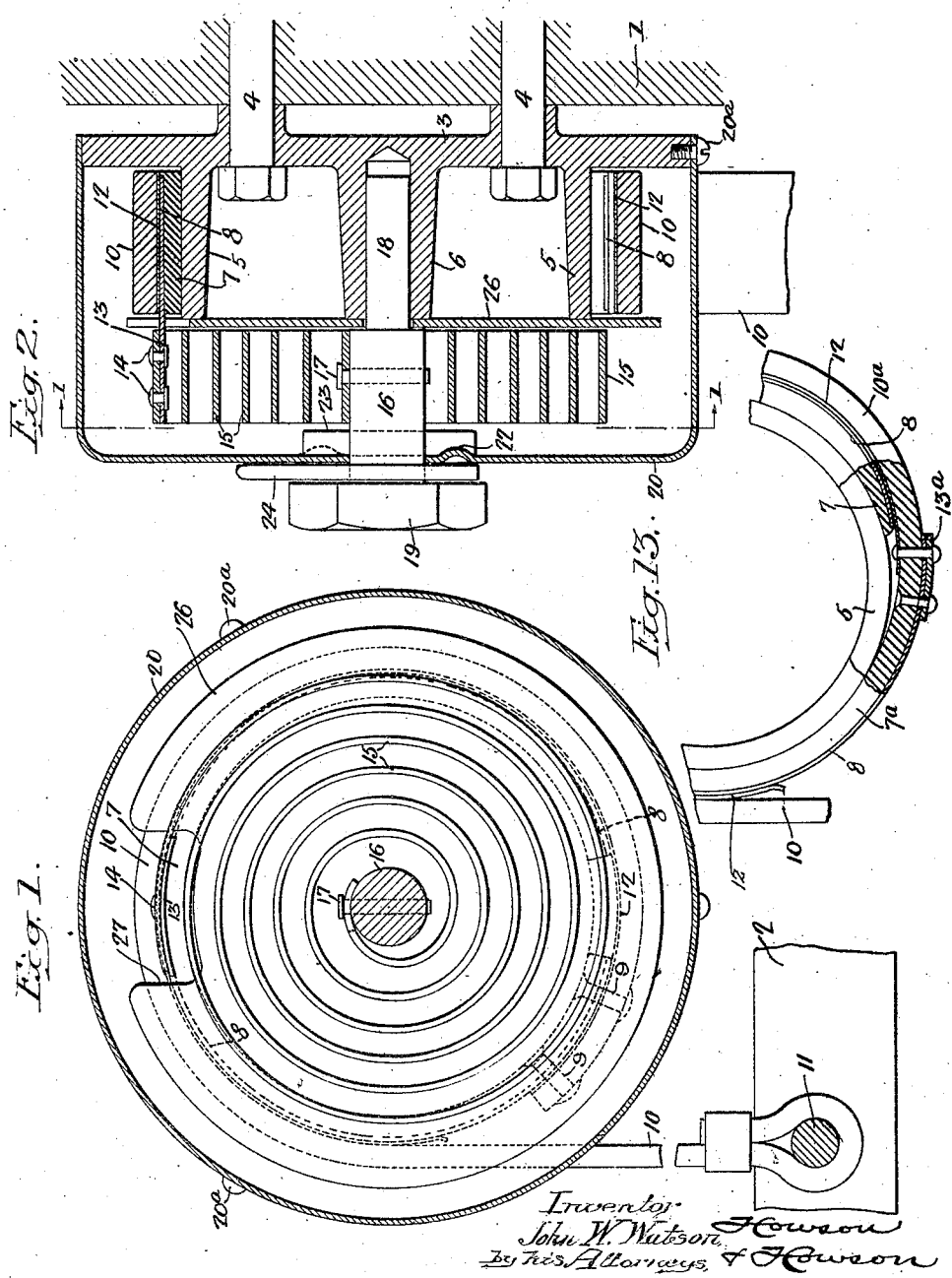

Oct. 26, 1926.
J. W. WATSON
1,604,864
MOTION RETARDING DEVICE
Filed August 8, 1919 3 Sheets-Sheet 2
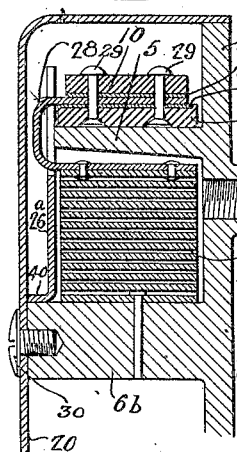
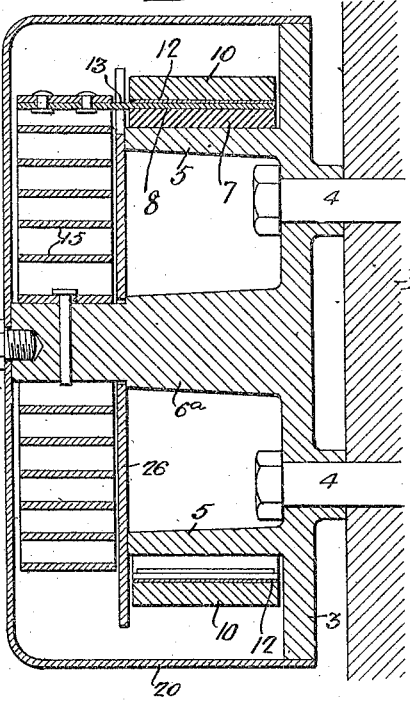
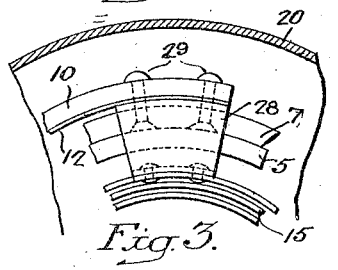
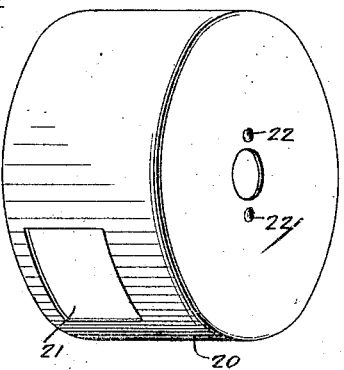
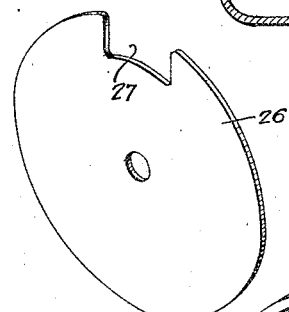
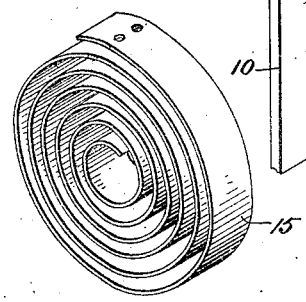
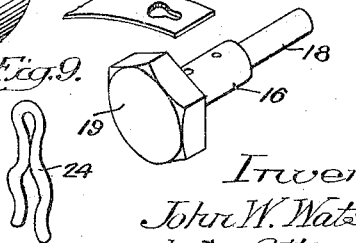
Inventor,
John W. Watson,
by his Attorneys,
Howson & Howson Oct. 26, 1926.

J. W. WATSON 1,604,864

MOTION RETARDING DEVICE

Filed August 8, 1919

Inventor,
John W. Watson
By his Attorneys,
Howson & Howson

Patented Oct. 26, 1926.

1,604,864

UNITED STATES PATENT OFFICE.

JOHN W. WATSON, OF WAYNE, PENNSYLVANIA.

MOTION-RETARDING DEVICE.

Application filed August 8, 1919. Serial No. 316,147.

My invention relates to that form of motion controlling mechanism adapted for connection between relatively movable bodies or members and especially designed to oppose or retard, by friction, relative movement of said bodies in one direction without opposing or retarding their relative movement in another direction.

A further object of my invention is to provide a mechanism, as above, which shall be substantial and durable.

I also desire to provide a motion retarding device of the above noted type whose parts shall be so arranged as to permit of the utilization of a flexible tension member of substantially flat form, such as a band or chain, rather than a cable of circular section; the invention including a tension applying element and a friction shoe operatively associated therewith.

Another object of my invention is to provide a motion controlling device including a drum, a shoe or friction band for said drum, and a tension band, with means for facilitating a relative gripping of said shoe and said drum when this action is desired.

These objects and other advantageous ends I attain as hereinafter set forth, reference being had to the accompanying drawings, in which:

Figs. 1 and 2 are vertical sections taken at right angles to each other, the former on the line 1—1, Fig. 2, illustrating a motion retarding device constructed in accordance with my invention;

Figs. 3 to 9 inclusive are perspective views illustrating the detail construction of certain parts of my invention;

Fig. 10 is a vertical section of a modified form of the invention in which the tension adjusting means is omitted;

Fig. 11 is a fragmentary vertical section illustrating a compact form of the invention in which the spring is mounted within the drum;

Fig. 12 is an elevation of the construction shown in Fig. 11;

Fig. 13 is a fragmentary side elevation, partly in section, illustrating another modification of the invention.

Figure 14:
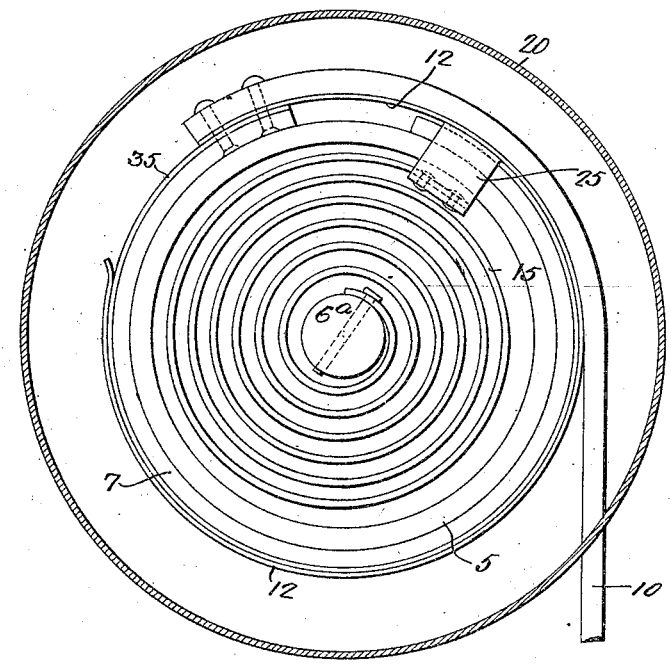
Fig. 14 is an elevation of a still further modification of my retarding device.

In the above drawings 1 and 2 represent two relatively movable structures or members whose motion away from each other it is desired to check or retard without affecting their freedom of movement toward each other. In order to accomplish this end I provide a device including a base plate 3 shown as of circular outline and rigidly mounted upon the member 1 by means of bolts or equivalent structures 4. Formed integral or otherwise rigidly attached to this plate 3 is a drum 5 projecting from its outer face and having central within it a hollow bearing post 6. Rotatably mounted on the drum is a brake shoe 7 in the form of a flat substantially circular strip of fabric or equivalent friction material such as is commonly used for brake or clutch linings, having rigidly fixed to or mounted upon its outside surface a backing 8 of metal or equivalent material, the construction and design of the shoe being such that its ends are normally separated. Mechanically attached to this shoe as by rivets 9, is a flexible tension-applying band 10 which is extended over or around the external surface of said shoe, and its free end attached by any suitable means to the member 2 as by the pin or stud 11 projecting therefrom.

If necessary to prevent sticking of the tension band 10 upon the adjacent external portions of the shoe 7, I mount between these two elements a thin metallic strip 12 (Fig. 5) preferably of a springy nature, fixing one end of the same in place by means of the rivets 9.

At any desired point on the shoe 7, depending upon the nature of the duty to be performed, I attach a spring 15 by any suitable mechanical means such as by laterally projecting the metallic backing 8 as indicated at 13. To this projection I rigidly connect said spring 15, as by rivets 14, and it is also connected to a spindle 16 by a headed pin which enters a key hole slot adjacent its end. The spindle 16 has its inner end 18 rotatably fitted into the bearing post 6 and its outer end has a head 19 whereby it may conveniently be turned. A cylindrical casing 20 is connected by screws 20ᵃ to the plate 3 so as to enclose the above described mechanism and this casing has a side opening 21 (Fig. 3) to permit of the passage of the tension band 10. It also is formed with any suitable number of inwardly extending projections 22 disposed around the opening for the spindle 16 and these serve as abutments for engagement with a pin 23 radially mounted in said spindle. The casing is so designed that when the spindle is forcibly turned, the head or casing end is sprung outwardly, allowing the pin 23 to pass over the projections 22 and permitting any desired variation of the tension of the coil spring 15. After such adjustment a spring cotter or fork 24 may be inserted between the end of the casing 20 and the spindle head 19 so as to prevent further relative movement of these parts;—it being understood that the means for making and holding the adjustment, as illustrated herewith, is shown merely by way of example, since other devices may be utilized to attain the same end without departing from my invention.

With the above described construction it is evident that if either of the members 1 or 2 be so moved as to lessen the distance between them, the spring 15 which is assembled with the necessary tension, is free to move the brake shoe 7 around the drum in a clockwise direction and thus relatively move the shoe and drum and wind the tension band 10 upon said shoe or rather upon the strip 12 which overlies the same. Obviously my invention offers no opposition to this approach of the two members 1 and 2 since the spring 15 is so adjusted by means of the spindle 16 as to insure the above described action of the parts. There is thus no binding of the shoe 7 upon the surface of the drum but rather a tendency to an opening or spreading thereof, although it may if desired be held in snug and close engagement with said drum by constructing the separating strip 12 of spring material of any desired closing strength.

When the members 1 and 2 move apart, the spring 15 tends to hold back the shoe 7 against the pull of the flexible element 10 and the resulting tension upon the latter, transmitted through the shoe 7, at once tends to draw this around the drum in such manner as to cause it to grip the same, this action being augmented by the strip 12 which effectually prevents any possible sticking of the tension band to the external surface of the shoe such as would interfere with or prevent this contraction of said shoe and its consequent gripping of the drum. As a result of the friction between the shoe and the drum, their relative movement is retarded to an extent dependent upon the tension of the spring 15 and there is a consequent retardation or braking of the movement apart of the members 1 and 2. As soon as the tension upon the band 10 is released and said members 1 and 2 again move toward each other, the spring 15 operates to loosen the shoe 7 upon the drum 5 and cause these two latter members to relatively move.

It is to be noted that while in Fig. 5 I have shown the lateral projection 13 for the attachment of the outer end of the spring 15 as placed about midway between the ends of the shoe 7, it may, depending upon the duty to be performed and without departing from my invention, be placed in any desired position on either side of that illustrated, as for example, adjacent that end of the shoe to which the tension band 10 is directly connected. This construction is shown in Fig 13, wherein the tension band is made structurally as well as functionally continuous with the shoe. For this purpose one end of the shoe 7ª is bevelled to permit it to fit snugly under the inner end of the tension band 10ª, which as before may have the strip 12 extended between it and the outer surface of said shoe. In this case the lateral projection for the attachment of the spring is shown as made in the form of a plate 13ª held by rivets to the shoe and its backing strip 8, and these rivets also serve to hold the inner end of the strip 12 to the inner surface of the tension band as before explained. The spring may also be positively attached to some point on the brake shoe or band by means of a strip 35 of metal or other suitable material which, as illustrated in Fig. 14, is extended from the point of junction of the band 10 and shoe 7 around the outside of the latter under the strip 12 to the desired point at which it is attached to the outer end of the spring in any suitable manner as shown in Figs. 2 or 11 for example.

If desired the adjustment for the spring 15 may be omitted without departing from my invention and the device be made as illustrated in Fig. 10, with the central post of the plate 3 extended centrally through said spring as at 6ª. The casing 20 in this case is clamped by a bolt 25 directly to the outer end of said post and the convolutions of the spring are maintained in place by a flat circular plate 26 mounted on the post 6ª adjacent the outer face of the drum 5. A similar plate is preferably used in that form of the invention shown in Figs. 1 and 2 and in each instance it has a peripheral notch or recess 27 to permit of the passage of the connecting element 13 between the spring and the shoe.

If desired to make the device in more compact form, the spring 15 may be mounted within the hollow of the drum 5 (Figs. 11 and 12) and have its inner end as before pinned to the central post 6ᵇ of the plate 3. The outer end of said spring might then be connected to the shoe by a U-shaped piece 28 riveted to the spring and held to said shoe by rivets 29. An end plate 26ª is rotatably mounted on the post 6ᵇ adjacent the outer face of the spring 15 and is formed with a suitable peripheral slot for the passage of the U-shaped connecting element 28; its central opening being outwardly flanged as indicated at 40 to give it suitable bearing upon the post 6ᵇ to which the casing 20 is clamped by a screw 30.

From the above description it will be seen that I have provided a simple, compact and substantial motion retarding device utilizing a substantially flat tension band and primarily of such a nature as to be durable.

I claim:

1. The combination in a motion retarding device, of a drum; a friction shoe for said drum; a flat tension element wound on and positively connected to the shoe; a member between said shoe and said tension element; and a spring operatively connected to the shoe for relatively moving the shoe and the drum under predetermined conditions and adapted to cause the shoe and drum to bind one upon the other under other conditions.

2. The combination in a motion retarding device of a drum; a friction shoe for said drum; a flat tension element wound on and positively connected to the shoe; a lateral projection from the shoe; and a spring connected to said projection for moving the shoe around the drum and winding the tension element on said shoe under predetermined conditions.

3. The combination in a motion retarding device of a drum; a friction shoe for said drum having a metallic backing with a projection; a flat tension element wound on and positively connected to the shoe; and a spring connected to said projection for moving the shoe around the drum under predetermined conditions.

4. The combination in a motion retarding device of a drum; a friction shoe in the form of a split ring mounted on said drum; a flat tension element having one end positively connected to said shoe and wound over the same; a lateral projection from the shoe adjacent its point of junction with the tension element; with a spring connected to said projection for causing rotation of the shoe about the drum and winding of the tension element on the shoe under predetermined conditions.

5. The combination in a motion retarding device of a drum; a friction shoe in the form of a split ring slidable about said drum; a flat tension element wound about the shoe and having one end positively connected adjacent one end of the shoe; a flexible strip connected to the shoe adjacent its point of junction with the tension element and extending between the latter and the shoe for reducing the friction between them; and a spring for moving the shoe about the drum in one direction and simultaneously winding said tension element.

6. The combination in a motion retarding device of a drum; a split ring of friction material and metallic backing extending around the drum and including a rigid lateral projection; a tension element wound upon said shoe; a strip extending between the tension element and the shoe; means for connecting one end of the shoe to one end of the tension element and also connecting said strip to said shoe; with a spring connected to said lateral projection for turning the shoe upon the drum and winding the tension element upon the shoe under predetermined conditions.

7. The combination in a motion retarding device of a drum; a split ring constituting a friction shoe for said drum; a flat tension element wound on and positively connected to the shoe so as to extend from one end thereof across the gap therein and over the other end; a spring for relatively moving the shoe and the drum under predetermined conditions; with a flexible spring strip lying between said shoe and the tension element and passing across the gap between the ends of the shoe.

In witness whereof I affix my signature.

JOHN W. WATSON.